(12) United States Patent
Fushiwaki et al.

(10) Patent No.: US 10,449,751 B2
(45) Date of Patent: Oct. 22, 2019

(54) METHOD FOR MANUFACTURING HIGH STRENGTH GALVANIZED STEEL SHEET

(71) Applicant: JFE STEEL CORPORATION, Chiyoda-ku, Tokyo (JP)

(72) Inventors: Yusuke Fushiwaki, Manchester (GB); Yoshiyasu Kawasaki, Chiba (JP); Yasunobu Nagataki, Tokyo (JP)

(73) Assignee: JFE STEEL CORPORATION, Tokyo (JP)

(*) Notice: Subject to any disclaimer, the term of this patent is extended or adjusted under 35 U.S.C. 154(b) by 1387 days.

(21) Appl. No.: 14/386,234

(22) PCT Filed: Mar. 7, 2013

(86) PCT No.: PCT/JP2013/001459
§ 371 (c)(1),
(2) Date: Sep. 18, 2014

(87) PCT Pub. No.: WO2013/140730
PCT Pub. Date: Sep. 26, 2013

(65) Prior Publication Data
US 2015/0030881 A1    Jan. 29, 2015

(30) Foreign Application Priority Data

Mar. 19, 2012  (JP) ................ 2012-061314

(51) Int. Cl.
| | | |
|---|---|---|
| *B32B 15/01* | (2006.01) | |
| *C23C 30/00* | (2006.01) | |
| *C21D 1/26* | (2006.01) | |
| *C23C 2/26* | (2006.01) | |
| *C22C 38/18* | (2006.01) | |
| *C22C 38/16* | (2006.01) | |
| *B32B 15/04* | (2006.01) | |
| *C22C 38/12* | (2006.01) | |
| *C22C 38/20* | (2006.01) | |

(Continued)

(52) U.S. Cl.
CPC .......... *B32B 15/013* (2013.01); *B32B 15/04* (2013.01); *B32B 15/043* (2013.01); *B32B 15/18* (2013.01); *C21D 8/0284* (2013.01); *C21D 9/46* (2013.01); *C21D 9/561* (2013.01); *C22C 38/02* (2013.01); *C22C 38/04* (2013.01); *C22C 38/06* (2013.01); *C22C 38/12* (2013.01); *C22C 38/14* (2013.01); *C22C 38/16* (2013.01); *C22C 38/18* (2013.01); *C22C 38/20* (2013.01); *C22C 38/22* (2013.01); *C22C 38/26* (2013.01); *C22C 38/28* (2013.01); *C22C 38/32* (2013.01); *C22C 38/40* (2013.01); *C22C 38/42* (2013.01); *C22C 38/44* (2013.01); *C22C 38/48* (2013.01); *C22C 38/50* (2013.01); *C22C 38/54* (2013.01); *C23C 2/02* (2013.01); *C23C 2/06* (2013.01); *C23C 2/26* (2013.01); *C23C 2/28* (2013.01); *C23C 2/40* (2013.01); *C23C 30/005* (2013.01); *C21D 1/26* (2013.01); *Y10T 428/12799* (2015.01)

(58) Field of Classification Search
CPC .... C23C 2/06; C23C 2/28; C23C 2/04; C23C 2/40; C23C 30/005; C23C 2/26; C23C 30/00; C23C 2/02; C21D 9/46; C21D 8/0284; C21D 9/561; C21D 1/26; C21D 1/34; C21D 9/56; C21D 8/0247; C21D 8/0273; C21D 8/0447; C21D 8/0473; C22C 38/06; C22C 38/02; C22C 38/04; C22C 38/12; C22C 38/14; C22C 38/16; C22C 38/18; C22C 38/20; C22C 38/22; C22C 38/26; C22C 38/28; C22C 38/32; C22C 38/40; C22C 38/42; C22C 38/44; C22C 38/48; C22C 38/50; C22C 38/54; Y10T 428/12799; Y10T 428/12611; Y10T 428/12618; Y10T 428/1266; Y10T 428/12951; Y10T 428/12972; Y10T 428/12979; Y10T 428/2495; Y10T 428/24967; Y10T 428/263; Y10T 428/264; Y10T 428/265; B32B 15/013; B32B 15/04; B32B 15/043; B32B 15/18
See application file for complete search history.

(56) References Cited

FOREIGN PATENT DOCUMENTS

| | | |
|---|---|---|
| CN | 1989267 | 6/2007 |
| EP | 1548142 A1 | 6/2005 |

(Continued)

OTHER PUBLICATIONS

Machine Translation, Koichi et al., JP 2003-138345, May 2003.*

(Continued)

*Primary Examiner* — Michael E. La Villa
(74) *Attorney, Agent, or Firm* — RatnerPrestia

(57) ABSTRACT

A method for manufacturing a high strength galvanized steel sheet which has a zinc coating layer with an amount of deposition of coating of 20 to 120 g/m² per one surface on the surface of a base steel sheet having a chemical composition comprising C: 0.03% to 0.35%, Si: 0.01% to 0.50%, Mn: 3.6% to 8.0%, Al: 0.001% to 1.000%, P≤0.10%, S≤0.010%, and the balance comprising Fe and incidental impurities, on a percent by mass basis, is provided. In annealing and galvanization treatment of the base steel sheet in a continuous galvanizing line, the maximum steel sheet temperature in an annealing furnace is 600° C. or higher and 750° C. or lower, the steel sheet transit time in a temperature region of the steel sheet temperature of 600° C. or higher and 750° C. or lower is specified to be 30 seconds or more and 10 minutes or less, and the dew point in an atmosphere is specified to be −10° C. or higher.

5 Claims, No Drawings

(51) Int. Cl.

| | | |
|---|---|---|
| *C22C 38/14* | (2006.01) | |
| *C22C 38/26* | (2006.01) | |
| *B32B 15/18* | (2006.01) | |
| *C22C 38/22* | (2006.01) | |
| *C22C 38/48* | (2006.01) | |
| *C22C 38/32* | (2006.01) | |
| *C22C 38/54* | (2006.01) | |
| *C22C 38/50* | (2006.01) | |
| *C22C 38/42* | (2006.01) | |
| *C22C 38/40* | (2006.01) | |
| *C22C 38/28* | (2006.01) | |
| *C22C 38/44* | (2006.01) | |
| *C23C 2/06* | (2006.01) | |
| *C23C 2/28* | (2006.01) | |
| *C21D 9/46* | (2006.01) | |
| *C22C 38/06* | (2006.01) | |
| *C21D 8/02* | (2006.01) | |
| *C22C 38/02* | (2006.01) | |
| *C22C 38/04* | (2006.01) | |
| *C23C 2/40* | (2006.01) | |
| *C21D 9/56* | (2006.01) | |
| *C23C 2/02* | (2006.01) | |

(56) References Cited

FOREIGN PATENT DOCUMENTS

| EP | 1980638 A1 | 10/2008 |
|---|---|---|
| JP | 11-012708 A | 1/1999 |
| JP | 2003-138345 A | 5/2003 |
| JP | 2004-315960 A | 11/2004 |
| JP | 2004-323970 A | 11/2004 |
| JP | 2007-046146 A | 2/2007 |
| JP | 2009-518541 A | 5/2009 |
| JP | 2009-287114 A | 12/2009 |
| JP | 2010-150660 A | 7/2010 |
| JP | 2010255109 | 11/2010 |
| JP | 2011-219778 A | 11/2011 |
| JP | 2011219779 | 11/2011 |
| WO | WO 2007/067014 A1 | 6/2007 |
| WO | 2009142362 | 11/2009 |

OTHER PUBLICATIONS

Japanese Office Action with partial English language translation for application No. JP 2012-061314, dated Apr. 2, 2016, 4 pages.

Chinese Office Action dated Jun. 17, 2016 for Chinese Application No. 201380015261.4, including Concise Statement of Relevance, 11 pages.

European Search Report dated Jul. 3, 2015 in European Application No. 13764557.8.

Japanese Office Acton wth Concise Statement of Relevance for Japanese Application No. 2012061314, dated Nov. 17, 2015, 5 pages.

European Office Action for European Application No. 13 764 557.8, dated Apr. 20, 2017—6 Pages.

International Search Report dated Jun. 4, 2013, application No. PCT/JP2013/001459.

European Communication for European Application No. 13 764 557.8, dated Feb. 5, 2018, 5 pages.

* cited by examiner

METHOD FOR MANUFACTURING HIGH STRENGTH GALVANIZED STEEL SHEET

CROSS REFERENCE TO RELATED APPLICATIONS

This is the U.S. National Phase application of PCT/JP2013/001459, filed Mar. 7, 2013, which claims priority to Japanese Patent Application No. 2012-061314, filed Mar. 19, 2012, the disclosures of each of these applications being incorporated herein by reference in their entireties for all purposes.

FIELD OF THE INVENTION

The present invention relates to a method for manufacturing a high strength galvanized steel sheet including a Si- and Mn-containing high strength steel sheet, as a base steel sheet, and having excellent coating appearance, coating peel resistance at severe forming, and formability, and a high strength galvanized steel sheet.

BACKGROUND OF THE INVENTION

In recent years, in the fields of automobiles, home appliances, constructions, and the like, coated steel sheets in which rust preventive properties are given to base steel sheets, most of all, galvanized steel sheets and galvannealed steel sheets, have been used widely. Also, from the viewpoint of enhancement of fuel economy of automobiles and improvement in crash safety of automobiles, there are increasing demands to reduce the weight and enhance the strength of a car body in itself by reducing the thickness through enhancement in strength of car body materials. Consequently, application of high strength steel sheets to automobiles has been promoted.

In general, a galvanized steel sheet is produced by using a steel sheet, as a base steel sheet, prepared through hot rolling and cold rolling of a slab and subjecting the base steel sheet to recrystallization annealing and galvanization treatment in a continuous galvanizing line (hereafter referred to as CGL). A galvannealed steel sheet is produced by further performing alloying treatment after the galvanization treatment.

Here, examples of annealing furnace type of CGL include DFF type (direct fire type), NOF type (non-oxidation type), and all radiant tube type. In recent years, construction of CGL provided with a furnace of all radiant tube type has increased for the reason that, for example, a high quality coated steel sheet can be produced at a low cost because of ease of operation, difficulty in occurrence of pick up, and the like. However, in contrast to the DFF type (direct fire type) and the NOF type (non-oxidation type), the all radiant tube type have no oxidation step just before annealing and, therefore, is disadvantageous to a steel sheet containing easy-to-oxidize elements, e.g., Si and Mn, from the viewpoint of ensuring of the wettability.

As for methods for manufacturing a galvanized steel sheet, where a high strength steel sheet containing large amounts of Si and Mn is used as a base steel sheet, Patent Literature 1 discloses a method comprising steps of annealing at a recrystallization temperature to 900° C. and of coating. Patent Literature 2 discloses a method comprising steps of annealing at 750° C. to 900° C. and of coating. Patent Literature 3 discloses a method comprising steps of annealing at 800° C. to 850° C. and of coating. However, in the case where the high strength steel sheet containing large amounts of Si and Mn is annealed at a temperature higher than 750° C., Si and Mn in steel are selectively oxidized to form oxides on the steel sheet surface, so that adhesion of coating may be degraded and defects, e.g., coating defects, may be generated.

In addition, Patent Literature 4 and Patent Literature 5 disclose methods in which internal oxidation of steel surface layer is induced by specifying a heating temperature in a reducing furnace on the basis of a formula represented by water vapor partial pressure and increasing a dew point. However, it is assumed that a dew point control area is the whole inside of the furnace and, therefore, control of the dew point is difficult and stable operation is difficult. Meanwhile, in production of a galvannealed steel sheet under unstable dew point control, variations are observed in the distribution of internal oxides formed in the base steel sheet, and defects, e.g., variations in wettability and alloying, may occur in the longitudinal direction or the transversal direction of a steel strip.

Moreover, applications of high strength galvanized steel sheets and high strength galvannealed steel sheets to parts to be severely formed have been promoted recently, and coating peel resistance characteristics in high degree of forming have been valued. Specifically, when a coated steel sheet is subjected to bending of more than 90° and is bent to an acuter angle or when a coated steel sheet is formed by impact, suppression of coating peel in a formed portion is required.

In order to satisfy such requirements, not only ensuring of desired microstructure of a base steel sheet by addition of large amounts of Si to the steel but also higher level of control of microstructure and structure of surface layer of the base steel sheet just below the coating layer, which may become a starting point of cracking and the like at severe forming, are required. However, it is difficult for the conventional arts described above to perform such control and it is not possible to produce a galvanized steel sheet having excellent coating peel resistance at severe forming by using a Si-containing high strength steel sheet as a base steel sheet in a CGL provided with a furnace of all radiant tube type as an annealing furnace.

CITATION LIST

Patent Literature

PTL 1: Japanese Unexamined Patent Application Publication No. 2009-287114
PTL 2: Japanese Unexamined Patent Application Publication No. 2009-518541
PTL 3: Japanese Unexamined Patent Application Publication No. 2010-150660
PTL 4: Japanese Unexamined Patent Application Publication No. 2004-323970
PTL 5: Japanese Unexamined Patent Application Publication No. 2004-315960

SUMMARY OF THE INVENTION

The present invention has been made in consideration of such circumstances and it is an object to provide a method for manufacturing a high strength galvanized steel sheet including a Si- and Mn-containing steel sheet, as a base steel sheet, and having excellent coating appearance, coating peel resistance at severe forming, and formability and a high strength galvanized steel sheet.

Until now, internal oxidation has been induced excessively by merely increasing a water vapor partial pressure in an annealing furnace and, thereby, increasing a dew point. Consequently, as described above, cracking occurs easily at forming and coating peel resistance is degraded. Then, the present inventors studied a new method for solving the issues, where the method was free from previously known ideas. As a result, it was found that a high strength galvanized steel sheet having excellent coating appearance and coating peel resistance at severe forming was obtained by strictly controlling the microstructure and structure of the base steel sheet surface layer, which may be serving as a starting point of cracking and the like at severe forming, just below the zinc coating layer. Specifically, an annealing is applied, followed by galvanizing, while a maximum steel sheet temperature in an annealing furnace is controlled to be 600° C. or higher and 750° C. or lower, a steel sheet transit time in a temperature region of the steel sheet temperature of 600° C. or higher and 750° C. or lower is controlled to be 30 seconds or more and 10 minutes or less, and a dew point in an atmosphere is controlled to be -10° C. or higher. Selective surface oxidation can be suppressed and surface concentration can be suppressed by performing such a treatment, so that a high strength galvanized steel sheet having excellent coating appearance and coating peel resistance at severe forming is obtained. In this regard, the term "having excellent coating appearance" refers to have an appearance in which coating defects and alloying variations are not observed. The high strength galvanized steel sheet obtained by the above-described method has microstructure and structure of the base steel sheet surface layer just below the zinc coating layer, in which 0.010 to 0.100 g/m$^2$ per one surface of oxides of at least one selected from Fe, Si, Mn, Al, P, and in addition, B, Nb, Ti, Cr, Mo, Cu, and Ni are formed in the surface layer within 100μm from the base steel sheet surface and oxides containing Mn are precipitated in the grains of the base steel sheet within 1 μm from the grain boundaries of the base steel sheet in the surface layer within 10 μm from the base steel sheet surface. Consequently, stress relaxation and prevention of cracking at bending in the base steel surface layer are realized, and thus excellent coating appearance and coating peel resistance at severe forming are exhibited.

The present invention is on the basis of the above-described findings and the features are as described below.

[1] A method for manufacturing a high strength galvanized steel sheet having a zinc coating layer with an amount of deposition of coating of 20 to 120 g/m$^2$ per one surface on the surface of a base steel sheet having a chemical composition comprising C: 0.03% to 0.35%, Si: 0.01% to 0.50%, Mn: 3.6% to 8.0%, Al: 0.001% to 1.000%, P 0.10%, S 0.010%, and the balance comprising Fe and incidental impurities, on a percent by mass basis, the method including the step of subjecting the base steel sheet to annealing and galvanization treatment in a continuous galvanizing line, characterized in that the maximum steel sheet temperature in an annealing furnace is 600° C. or higher and 750° C. or lower, the steel sheet transit time in a temperature region of the steel sheet temperature of 600° C. or higher and 750° C. or lower is specified to be 30 seconds or more and 10 minutes or less, and the dew point in an atmosphere is specified to be -10° C. or higher.

[2] The method for manufacturing a high strength galvanized steel sheet, according to [1], characterized in that the chemical composition further contains at least one selected from B: 0.001% to 0.005%, Nb: 0.005% to 0.050%, Ti: 0.005% to 0.050%, Cr: 0.001% to 1.000%, Mo: 0.05% to 1.00%, Cu: 0.05% to 1.00%, and Ni: 0.05% to 1.00%, on a percent by mass basis.

[3] The method for manufacturing a high strength galvanized steel sheet, according to [1] or [2], characterized in that after the above-described galvanization treatment is applied, an alloying treatment is further applied by heating the steel sheet to a temperature of 450° C. or higher and 600° C. or lower to specify the Fe content in the zinc coating layer to be within the range of 8 to 14 percent by mass.

[4] A high strength galvanized steel sheet produced by the manufacturing method according to any one of [1] to [3], characterized in that 0.010 to 0.100 g/m$^2$ per one surface of oxides of at least one selected from Fe, Si, Mn, Al, P, B, Nb, Ti, Cr, Mo, Cu, and Ni are formed in the surface layer within 100 μm from the base steel sheet surface just below the zinc coating layer and, in addition, oxides containing Mn are present in the grains of the base steel sheet within 1μm from the grain boundaries of the base steel sheet in the surface layer within 10 μm from the base steel sheet surface just below the zinc coating layer.

In this regard, in the present invention, the high strength galvanized steel sheet refers to a steel sheet having a tensile strength TS of 590 MPa or more. Also, the high strength galvanized steel sheets in the present invention include all coated steel sheets not subjected to an alloying treatment after the galvanization treatment (hereafter may be referred to as GI) and coated steel sheets subjected to an alloying treatment after the galvanization treatment (hereafter may be referred to as GA).

According to the present invention, a high strength galvanized steel sheet having excellent coating appearance, coating peel resistance at severe forming, and formability is obtained.

DETAILED DESCRIPTION OF EMBODIMENTS OF THE INVENTION

The present invention will be specifically described below. In this regard, in the following explanations, all units of the contents of the individual elements of the steel chemical composition and the contents of the individual elements of the coating layer chemical composition are "percent by mass" and are hereafter expressed as "%" unless otherwise specified.

To begin with, the annealing atmosphere condition, which is the most important requirement in the present invention, to determine the structure of the base steel sheet surface just below the zinc coating layer will be described.

Annealing and galvanization treatment is performed while a maximum steel sheet temperature in an annealing furnace is controlled to be 600° C. or higher and 750° C. or lower, a steel sheet transit time in a temperature region of the steel sheet temperature of 600° C. or higher and 750° C. or lower is controlled to be 30 seconds or more and 10 minutes or less, and a dew point in an atmosphere is controlled to be -10° C. or higher and, thereby, it becomes possible to allow an appropriate amount of oxides of easy-to-oxidize elements (Si, Mn, and the like) to become present in the inside within 100 μm from the base steel sheet surface (hereafter referred to as internal oxide) and suppress selective surface oxidation (hereafter referred to as surface concentration) of Si, Mn, and the like in the steel sheet surface layer, which degrades the wettability of the base steel sheet in galvanization after annealing.

The maximum steel sheet temperature in an annealing furnace is specified to be 600° C. or higher and 750° C. or lower for the reason described below. In the temperature region of lower than 600° C., surface concentration and internal oxidation do not occur to such an extent that occurrence of coating defect, degradation in corrosion resistance, degradation in coating peel resistance, and the like become problems, although good mechanical properties of the galvanized steel sheet are not obtained. Therefore, the maximum steel sheet temperature at which the effects of the present invention are exerted is specified to be preferably 600° C. or higher. On the other hand, in the temperature range of higher than 750° C., surface concentration becomes significant, occurrence of coating defect, degradation in corrosion resistance, degradation in coating peel resistance, and the like become considerable. In addition, from the viewpoint of the mechanical properties, the balance between the strength TS and the Elongation El is saturated in the temperature range of higher than 750° C. Consequently, the maximum steel sheet temperature is specified to be 600° C. or higher and 750° C. or lower.

Next, the steel sheet transit time in a temperature region of the steel sheet temperature of 600° C. or higher and 750° C. or lower is specified to be 30 seconds or more and 10 minutes or less for the reason described below. If the steel sheet transit time is less than 30 seconds, the predetermined mechanical properties (TS, El) are not obtained. On the other hand, if the steel sheet transit time is more than 10 minutes, the balance between the TS and the El is saturated.

The dew point in a temperature region of the maximum steel sheet temperature of 600° C. or higher and 750° C. or lower is specified to be −10° C. or higher for the reason described below. It is possible to increase the $O_2$ potential resulting from decomposition of $H_2O$ and facilitate internal oxidation by increasing the dew point. The amount of internal oxidation is small in the temperature range of lower than −10° C. Meanwhile, the upper limit of the dew point is not specified. However, if 60° C. is exceeded, the amount of oxidation of Fe increases and the inside of the annealing furnace and rolls in the annealing furnace may be degraded, so that 60° C. or lower is desirable.

Next, the base steel chemical composition of the high strength galvanized steel sheet according to embodiments of the present invention, will be described.

C: 0.03% to 0.35%

Carbon improves the formability by forming martensite and the like in a microstructure. For that purpose, 0.03% or more is necessary. On the other hand, if 0.35% is exceeded, the weldability is degraded. Therefore, the amount of C is specified to be 0.03% or more and 0.35% or less.

Si: 0.01% to 0.50%

Silicon is an element effective in enhancing the strength of steel and obtaining good mechanical properties but is an easy-to-oxidize element, so that there is a wettability disadvantage and addition of Si element is avoided as much as possible. However, about 0.01% is contained in steel incidentally and reduction to less than or equal to that causes an increase in cost. Then, the lower limit is specified to be 0.01%. On the other hand, if 0.50% is exceeded, improvement in coating peel resistance at severe forming becomes difficult. Therefore, the amount of Si is specified to be 0.01% or more and 0.50% or less.

Mn: 3.6% to 8.0%

Manganese is an element effective in enhancing the strength of steel. In order to ensure the mechanical properties including the strength, it is necessary that the amount of Mn be 3.6% or more. On the other hand, if 8.0% is exceeded, it becomes difficult to ensure the weldability and the adhesion of coating and ensure the balance between the TS and the El. Therefore, the amount of Mn is specified to be 3.6% or more and 8.0% or less.

Al: 0.001% to 1.000%

Aluminum is added for the purpose of deoxidizing a molten steel. However, if the amount of Al is less than 0.001%, the purpose is not achieved. The effect of deoxidizing a molten steel is obtained when the amount of Al is 0.001% or more. On the other hand, if 1.000% is exceeded, the cost increases. Therefore, the amount of Al is specified to be 0.001% or more and 1.000% or less.

P≤0.10%

Phosphorus is one of elements contained incidentally. Reduction the amount of P to less than 0.005% may increase the cost, so that 0.005% or more is desirable. On the other hand, if the amount of P is more than 0.10%, the weldability is degraded. Furthermore, the surface quality is degraded. Meanwhile, the adhesion of coating is degraded when an alloying treatment is not applied, and in the alloying treatment, a desired alloying cannot be achieved unless the alloying treatment temperature is increased. In addition, in the case where the alloying treatment temperature is increased to achieve the desired alloying, the ductility is degraded and, at the same time, the adhesion of alloyed coating film is degraded, so that the compatibility between desired alloying and good ductility and adhesion of alloyed coating film cannot be ensured. Therefore, the amount of P is specified to be 0.10% or less, and the lower limit is desirably 0.005%.

S≤0.010%

Sulfur is one of elements contained incidentally. Although the lower limit is not specified, 0.010% or less is preferable because if a large amount is contained, the weldability is degraded.

In this regard, in order to control the balance between the TS and the El, at least one selected from B: 0.001% to 0.005%, Nb: 0.005% to 0.050%, Ti: 0.005% to 0.050%, Cr: 0.001% to 1.000%, Mo: 0.05% to 1.00%, Cu: 0.05% to 1.00%, and Ni: 0.05% to 1.00% may be added as necessary. In the case where these elements are added, appropriate amounts of addition are specified for the reasons described below.

B: 0.001% to 0.005%

If B is less than 0.001%, a hardenability-promoting effect is not obtained easily. On the other hand, if 0.005% is exceeded, the adhesion of coating is degraded. Therefore, in the case where B is contained, the amount of B is specified to be 0.001% or more and 0.005% or less. However, addition is not necessary in the case where it is considered that there is no need for addition from the viewpoint of improvements in mechanical properties.

Nb: 0.005% to 0.050%

If Nb is less than 0.005%, an effect of adjusting the strength and an effect of improving the adhesion of coating when added in combination with Mo are not obtained easily. On the other hand, if 0.050% is exceeded, an increase in cost is caused. Therefore, in the case where Nb is contained, the amount of Nb is specified to be 0.005% or more and 0.050% or less.

Ti: 0.005% to 0.050%

If Ti is less than 0.005%, an effect of adjusting the strength is not obtained easily. On the other hand, if 0.050% is exceeded, the adhesion of coating is degraded. Therefore, in the case where Ti is contained, the amount of Ti is specified to be 0.005% or more and 0.050% or less.

Cr: 0.001% to 1.000%

If Cr is less than 0.001%, a hardenability effect is not obtained easily. On the other hand, if 1.000% is exceeded, the adhesion of coating and the weldability are degraded because surface concentration of Cr occurs. Therefore, in the case where Cr is contained, the amount of Cr is specified to be 0.001% or more and 1.000% or less.

Mo: 0.05% to 1.00%

If Mo is less than 0.05%, an effect of adjusting the strength and an effect of improving the adhesion of coating when added in combination with Nb, Ni or Cu are not obtained easily. On the other hand, if 1.00% is exceeded, an increase in cost is caused. Therefore, in the case where Mo is contained, the amount of Mo is specified to be 0.05% or more and 1.00% or less.

Cu: 0.05% to 1.00%

If Cu is less than 0.05%, an effect of promoting the formation of retained γ phase and an effect of improving the adhesion of coating when added in combination with Ni or Mo are not obtained easily. On the other hand, if 1.00% is exceeded, an increase in cost is caused. Therefore, in the case where Cu is contained, the amount of Cu is specified to be 0.05% or more and 1.00% or less.

Ni: 0.05% to 1.00%

If Ni is less than 0.05%, an effect of promoting the formation of retained γ phase and an effect of improving the adhesion of coating when added in combination with Cu or Mo are not obtained easily. On the other hand, if 1.00% is exceeded, an increase in cost is caused. Therefore, in the case where Ni is contained, the amount of Ni is specified to be 0.05% or more and 1.00% or less.

The balance other than those described above includes Fe and incidental impurities.

Next, the method for manufacturing a high strength galvanized steel sheet, according to embodiments of the present invention, and reasons for the preferred features thereof will be described.

A steel containing the above-described chemical composition is hot-rolled and, thereafter, is cold-rolled to produce a steel sheet. Subsequently, an annealing and galvanization treatment is performed in a continuous galvanizing line. In this regard, in the present invention, a maximum steel sheet temperature in an annealing furnace is 600° C. or higher and 750° C. or lower, a steel sheet transit time in a temperature region of the steel sheet temperature of 600° C. or higher and 750° C. or lower is specified to be 30 seconds or more and 10 minutes or less, and a dew point in an atmosphere is specified to be -10° C. or higher. This is the most important requirement in the present invention. The temperature, the time, and the dew point, that is, the oxygen partial pressure in the atmosphere, are controlled, as described above, in the annealing and galvanization treatment step and, thereby, Si, Mn and the like which are easy-to-oxidize element to increase the oxygen potential are subjected to internal oxidation in advance just before the coating, so that the activities of Si and Mn are reduced in the base steel sheet surface layer. Such reduction in the activity suppresses external oxidation of these elements and, as a result, the wettability and the coating peel resistance are improved.

Hot Rolling

The hot rolling can be performed under the condition employed usually.

Pickling

Preferably, a pickling treatment is performed after the hot rolling. Scales generated on the surface of steel are removed in the pickling step, and then, cold rolling is performed. In this regard, the pickling condition is not specifically limited.

Cold Rolling

Preferably, the cold rolling is performed at a reduction rate of 40% or more and 80% or less. If the reduction rate is less than 40%, the recrystallization temperature is lowered and, thereby, the mechanical properties are degraded easily. On the other hand, if the reduction rate is more than 80%, not only the rolling cost increases because of a high strength steel sheet but also the coating characteristics are degraded because surface concentration in the annealing increases.

The cold rolled steel sheet is annealed and is subjected to a galvanization treatment. In the annealing furnace, a heating step to heat the steel sheet to a predetermined temperature is performed in a heating zone in the former part, and a soaking step to hold the steel sheet at a predetermined temperature for a predetermined time is performed in a soaking zone in the latter part. As described above, the annealing and galvanization treatment is performed while a maximum steel sheet temperature in the annealing furnace is controlled to be 600° C. or higher and 750° C. or lower, a steel sheet transit time in a temperature region of the steel sheet temperature of 600° C. or higher and 750° C. or lower is controlled to be 30 seconds or more and 10 minutes or less, and a dew point in an atmosphere is controlled to be -10° C. or higher. The dew point in the annealing atmosphere in the temperature region out of 600° C. or higher and 750° C. or lower is not specifically limited. The dew point in the atmosphere out of the temperature region of 600° C. or higher and 750° C. or lower is preferably -50° C. to -10° C.

In this regard, if the volume fraction of $H_2$ in the atmosphere is less than 1%, an activation effect due to reduction is not obtained and the coating peel resistance is degraded. The upper limit is not specified, although if 50% is exceeded, the cost increases and the effects are saturated. Therefore, the volume fraction of $H_2$ is preferably 1% or more and 50% or less. Meanwhile, the remainder is composed of $N_2$ and incidental impurity gases. Other gas components, e.g., $H_2O$, $CO_2$, and CO, may be contained insofar as the effects of the present invention are not impaired.

Meanwhile, in the case where comparisons are made under the same annealing conditions, the amounts of surface concentration of Si and Mn increase in proportion to the amounts of Si and Mn in steel. Also, in the case of the same steel, in a relatively high oxygen potential atmosphere, Si and Mn in steel shift to internal oxidation and, therefore, the amount of surface concentration decreases along with an increase in the oxygen potential in the atmosphere. Consequently, in the case where the amounts of Si and Mn in steel are large, it is necessary that the oxygen potential in the atmosphere be increased by increasing the dew point.

The galvanization treatment can be performed by a common method.

Next, an alloying treatment is performed as necessary. In the case where the alloying treatment is performed following the galvanization treatment, after the galvanization treatment is performed, preferably, the alloying treatment is performed by heating the steel sheet to 450° C. or higher and 600° C. or lower in such a way that the Fe content in the zinc coating layer becomes 8% to 14%. If the Fe content is less than 8%, alloying variations occur and the flaking property is degraded. On the other hand, if 14% is exceeded, the coating peel resistance is degraded.

In this manner, the high strength galvanized steel sheet according to the present invention is obtained. The high strength galvanized steel sheet according to the present invention has a zinc coating layer with an amount of deposition of coating of 20 to 120 g/m² per one surface on the surface of a base steel sheet. If the amount of deposition is less than 20 g/m², it becomes difficult to ensure the corrosion resistance. On the other hand, if 120 g/m² is exceeded, the coating peel resistance is degraded.

As described below, the features are included in the structure of the base steel sheet surface just below the zinc coating layer.

In a surface layer within 100 μm from the base steel sheet surface just below the zinc coating layer, 0.010 to 0.100 g/m² per one surface of oxides of at least one selected from Fe, Si, Mn, Al, P, and in addition, B, Nb, Ti, Cr, Mo, Cu, and Ni in total are formed. Also, oxides containing Mn are present in the grains of the base steel sheet within 1 μm from the grain boundaries of the base steel sheet in the surface layer within 10 μm from the base steel sheet surface just below the zinc coating layer.

In order to satisfy the coating peel resistance at severe forming of the galvanized steel sheet in which Si and large amounts of Mn are added to the steel, it is required to highly control the microstructure and the structure, which may become a starting point of cracking at severe forming and the like, of the base steel sheet surface layer just below the zinc coating layer. Then, in the present invention, to begin with, the oxygen potential is increased in the annealing step and the dew point is controlled as described above in order to ensure the wettability and, thereby, Si, Mn and the like which are easy-to-oxidize element are subjected to internal oxidation in advance just before the coating, so that the activities of Si and Mn are reduced in the base steel sheet surface layer. Such reduction in the activity suppresses external oxidation of these elements and, as a result, the wettability and the coating peel resistance are improved. Furthermore, this improving effect allows 0.010 g/m² or more per one surface of oxides of at least one selected from Fe, Si, Mn, Al, P, and in addition, B, Nb, Ti, Cr, Mo, Cu, and Ni to become present in a surface layer within 100 μm from the base steel sheet surface just below the zinc coating layer. On the other hand, even if more than 0.100 g/m² are present, this effect is saturated. Therefore, the upper limit is specified to be 0.100 g/m². Meanwhile, in the case where internal oxides are present only at grain boundaries of the base steel sheet and not present in grains of the base steel sheet, grain boundary diffusion of the easy-to-oxidize elements in steel can be suppressed, although intragranular diffusion may not be suppressed sufficiently. Therefore, in the present invention, as described above, the maximum steel sheet temperature in the annealing is controlled to be 600° C. or higher and 750° C. or lower, the steel sheet transit time in a temperature region of the steel sheet temperature of 600° C. or higher and 750° C. or lower is controlled to be 30 seconds or more and 10 minutes or less, and the dew point in the atmosphere is controlled to be -10° C. or higher and, thereby, the internal oxidation is induced not only at grain boundaries but also in grains. Specifically, oxides containing Mn are allowed to become present in grains within 1 μm from the base steel sheet grain boundaries in the surface layer within 10 μm from the base steel sheet surface just below the zinc coating layer. Oxides are present in grains and, thereby, the amounts of solid solutions Si and Mn in grains in the vicinity of oxides are decreased. As a result, concentration of Si and Mn on the surface due to intragranular diffusion can be suppressed.

In this regard, the structure of the base steel sheet surface layer just below the zinc coating layer of the high strength galvanized steel sheet obtained by the manufacturing method according to the present invention is as described above. However, for example, growth of the above-described oxides in a region more than 100 μm away from just below the zinc coating layer (coating/base steel sheet interface) causes no problem. Also, presence of oxides containing Mn in grains 1 μm or more away from grain boundaries in a region more than 10 μm away from the base steel sheet surface just below the zinc coating layer causes no problem.

Furthermore, in addition to that described above, in the present invention, it is preferable that the steel sheet microstructure, in which oxides containing Mn grow, be a mild ferrite phase having good formability in order to improve the coating peel resistance.

Example 1

The present invention will be specifically described below with reference to the examples.

The hot rolled steel sheets having a composition shown in Table 1 were pickled to remove scales and, thereafter, cold rolled under the condition shown in Table 2, so that cold rolled steel sheets having a thickness of 1.0 mm were obtained.

TABLE 1

| Steel symbol | (percent by mass) | | | | | | | | | | | | |
|---|---|---|---|---|---|---|---|---|---|---|---|---|---|
| | C | Si | Mn | Al | P | S | Cr | Mo | B | Nb | Cu | Ni | Ti |
| A | 0.12 | 0.03 | 4.5 | 0.03 | 0.01 | 0.004 | — | — | — | — | — | — | — |
| B | 0.03 | 0.03 | 4.6 | 0.03 | 0.01 | 0.004 | — | — | — | — | — | — | — |
| C | 0.35 | 0.03 | 4.7 | 0.02 | 0.01 | 0.004 | — | — | — | — | — | — | — |
| D | 0.12 | 0.10 | 4.5 | 0.03 | 0.01 | 0.004 | — | — | — | — | — | — | — |
| E | 0.13 | 0.30 | 4.7 | 0.04 | 0.01 | 0.004 | — | — | — | — | — | — | — |
| F | 0.12 | 0.50 | 4.6 | 0.03 | 0.01 | 0.004 | — | — | — | — | — | — | — |
| G | 0.12 | 0.03 | 3.6 | 0.02 | 0.01 | 0.004 | — | — | — | — | — | — | — |
| H | 0.13 | 0.03 | 6.3 | 0.03 | 0.01 | 0.004 | — | — | — | — | — | — | — |
| I | 0.12 | 0.03 | 8.0 | 0.02 | 0.01 | 0.004 | — | — | — | — | — | — | — |
| J | 0.13 | 0.03 | 4.5 | 0.30 | 0.01 | 0.004 | — | — | — | — | — | — | — |
| K | 0.12 | 0.03 | 4.6 | 1.00 | 0.01 | 0.004 | — | — | — | — | — | — | — |
| L | 0.12 | 0.03 | 4.7 | 0.03 | 0.05 | 0.004 | — | — | — | — | — | — | — |
| M | 0.12 | 0.03 | 4.5 | 0.02 | 0.10 | 0.004 | — | — | — | — | — | — | — |
| N | 0.13 | 0.02 | 4.7 | 0.03 | 0.01 | 0.009 | — | — | — | — | — | — | — |
| O | 0.12 | 0.03 | 4.6 | 0.02 | 0.01 | 0.004 | 0.8 | — | — | — | — | — | — |
| P | 0.13 | 0.03 | 4.5 | 0.03 | 0.01 | 0.004 | — | 0.1 | — | — | — | — | — |
| Q | 0.13 | 0.02 | 4.7 | 0.03 | 0.01 | 0.004 | — | — | 0.003 | — | — | — | — |
| R | 0.12 | 0.03 | 4.5 | 0.05 | 0.01 | 0.004 | — | — | 0.001 | 0.03 | — | — | — |
| S | 0.13 | 0.03 | 4.5 | 0.03 | 0.01 | 0.004 | — | 0.1 | — | — | 0.1 | 0.2 | — |
| T | 0.12 | 0.02 | 4.7 | 0.04 | 0.01 | 0.004 | — | — | 0.001 | — | — | — | 0.02 |

TABLE 1-continued

| Steel symbol | C | Si | Mn | Al | P | S | Cr | Mo | B | Nb | Cu | Ni | Ti |
|---|---|---|---|---|---|---|---|---|---|---|---|---|---|
| U | 0.13 | 0.03 | 4.6 | 0.03 | 0.01 | 0.004 | — | — | — | — | — | — | 0.05 |
| XA | 0.02 | 0.02 | 4.6 | 0.03 | 0.01 | 0.004 | — | — | — | — | — | — | — |
| XB | 0.36 | 0.03 | 4.7 | 002 | 0.01 | 0.004 | — | — | — | — | — | — | — |
| XC | 0.12 | 0.60 | 4.5 | 0.03 | 0.01 | 0.004 | — | — | — | — | — | — | — |
| XD | 0.13 | 0.03 | 3.5 | 0.03 | 0.01 | 0.004 | — | — | — | — | — | — | — |
| XE | 0.12 | 0.03 | 4.6 | 1.18 | 0.01 | 0.004 | — | — | — | — | — | — | — |
| XF | 0.13 | 0.02 | 4.5 | 0.03 | 0.12 | 0.004 | — | — | — | — | — | — | — |
| XG | 0.12 | 0.02 | 4.7 | 0.04 | 0.01 | 0.020 | — | — | — | — | — | — | — |

Underlined data are out of the scope of the present invention

Subsequently, the cold rolled steel sheets obtained as described above was put into a CGL provided with a furnace of all radiant tube type for annealing. In a CGL, as shown in Table 2, sheets were annealed while a dew point, a steel sheet transit time, and a maximum steel sheet temperature in a predetermined temperature region in the annealing furnace were controlled, heating was performed in a heating zone, and soaking-holding was performed in a soaking zone, and, thereafter, a galvanization treatment was performed with an Al-containing Zn bath at 460° C. In this regard, the dew point and the temperature were measured by aspirating the atmosphere gas from the center portion in the furnace. Also, the dew point in the region other than the temperature region in which the dew point was controlled was specified to be −35° C.

The gas components of the atmosphere were composed of $N_2$, $H_2$, and incidental impurities. As for a control of the dew point in the atmosphere, a piping arrangement, through which a $N_2$ gas humidified by heating a water tank disposed in $N_2$ was passed, was disposed separately, a $H_2$ gas was introduced and mixed into the humidified $N_2$ gas, this mixed gas was introduced into the furnace and, thereby, the dew point in the atmosphere was controlled.

Also, a 0.14% Al-containing Zn bath was used for GA, and a 0.18% Al-containing Zn bath was used for GI. The amount of deposition was adjusted to the predetermined amount of deposition (amount of deposition per one surface) shown in Table 2 by gas wiping, and an alloying treatment was performed for GA.

The appearance (coating appearance), the coating peel resistance at severe forming, and the formability of the thus obtained galvanized steel sheets (GA and GI) were examined. Also, the amount of oxides present in a surface layer within 100 μm from the base steel sheet just below the zinc coating layer (amount of internal oxidation), the form and the growth sites of oxides containing Mn, which were present in the surface layer within 10 μm from the base steel sheet just below the zinc coating layer, and intragranular precipitates just below the coating layer at the position within 1 μm of the grain boundaries were measured. The measuring methods and the evaluation criteria are as described below.

<Appearance>
As for the appearance, the case where there was no poor appearance, e.g., coating defects and alloying variations, was evaluated as good (symbol ◯), and the case where there was poor appearance was evaluated as poor (symbol x).

<Coating Peel Resistance>
As for the coating peel resistance at severe forming, when GA is subjected to bending of more than 90°, suppression of coating peel of a bent portion is required. In the present example, a cellophane tape (registered trademark) was pushed against a bent portion in the case of 120° bending and peeled, thus peeled substances were transferred to the cellophane tape (registered trademark), and the amount of peeled substances on the cellophane tape (registered trademark) was determined as the number of Zn counts on the basis of a fluorescent X-ray method. In this regard, the mask diameter was 30 mm, the acceleration voltage of fluorescent X-ray was 50 kV, the acceleration current was 50 mA, and the measurement time was 20 seconds at this time. In the light of the criteria described below, those of ranks 1, 2, 3, and 4 were evaluated as good coating peel resistance (symbol ⊙, ◯), and those of rank 5 were evaluated as poor coating peel resistance (symbol x). The performance marked with the symbol ⊙ or ◯ has no problem in the coating peel resistance at severe forming. The performance marked with the symbol x is not suitable for a practical use usually.

The number of Zn counts by fluorescent X-ray Rank
0 or more and less than 500: 1 (good) ⊙
500 or more and less than 1,000: 2 ◯
1,000 or more and less than 2,000: 3 ◯
2,000 or more and less than 3,000: 4 ◯
3,000 or more: 5 (poor) x GI is required to have the coating peel resistance in an impact test. A ball impact test was performed, the formed portion was subjected to tape peeling, and presence or absence of coating layer peel was evaluated visually. The ball impact condition was a ball weight of 1,000 g and a drop height of 100 cm.
◯: coating layer was not peeled
x: coating layer was peeled <Formability>
As for the formability, a JIS No. 5 test piece was prepared, and the tensile strength (TS (MPa)) and the elongation (El (%)) were measured. Those exhibited TS×El≥24,000 were evaluated as good and those exhibited TS×El<24,000 were evaluated as poor.

<Amount of Internal Oxidation in a Surface Region within 100 μm from the Base Steel Sheet Just Below Zinc Coating Layer>
The amount of internal oxidation was measured by "the impulse furnace fusion-infrared absorption method". In this regard, it is necessary that the amount of oxygen contained in the base steel sheet (that is, high-tensile steel sheet before application of annealing) be subtracted. Therefore, in the present invention, the surface layers of both surfaces of the steel sheet after continuous annealing were polished by 100 μm or more, the oxygen concentration in steel was measured as an amount of oxygen OH contained in the base steel sheet. Also, the oxygen concentration in steel in the whole sheet thickness direction of the steel sheet after continuous annealing was measured, as an amount of oxygen OI after internal oxidation. A difference between OI and OH (=OI−OH) was calculated by using the thus obtained amount of oxygen OI after the internal oxidation of the base steel sheet and the amount of oxygen OH contained in the base steel sheet and, furthermore, the value (g/m$^2$) converted to the amount per one surface unit area (that is, 1 m$^2$) as an amount of internal oxidation.

<Growth Sites of Oxides Containing Mn, which are Present in a Surface Layer within 10 μm from the Base Steel Sheet Surface Just Below Zinc Coating Layer, and Intragranular Precipitates Just Below Zinc Coating Layer at a Position within 1 μm from Grain Boundaries of the Base Steel Sheet>

After the zinc coating layer was removed by dissolution, the cross-section thereof was observed with SEM, distinction between amorphous and crystalline was examined by electron diffraction of intragranular precipitates and, likewise, the composition was determined by EDX and EELS. In the case where intragranular precipitates contained Mn and O, these precipitates were determined as oxides containing Mn. The magnification of field of view was 5,000 to 20,000 times and five sites each were examined. In the case where oxides containing Mn were observed in at least one site of the five sites, it was determined that oxides containing Mn were present. As for whether the growth site of internal oxidation was ferrite or not, presence or absence of second phases was examined with cross-section SEM, and in the case where no second phase was observed, the growth site was determined as ferrite. Meanwhile, oxides containing Mn in grains within 1 μm from the base steel sheet grain boundaries in a region within 10 μm from the base steel sheet surface just below the zinc coating layer were determined in the same technique as that described above, where precipitation oxides were extracted from the cross-section by an extraction replica method.

The thus obtained results are shown in Table 2 together with the production conditions.

TABLE 2

| | | | | Production method | | | | | internal oxide in region within 10 μm of just below coating layer | |
|---|---|---|---|---|---|---|---|---|---|---|
| | | Steel | | | Annealing furnace | | | | | Presence or absence of intergranular precipitate at position within 1 μm of grain boundaries just below coating layer |
| No. | Symbol | Si (percent by mass) | Mn (percent by mass) | Cold rolling reduction rate (%) | Dew point in 600-750° C. (° C.) | Maximum steelsheet temperature (° C.) | Steelsheet transit time in 600-750° C. (min) | Alloying temperature (° C.) | Amount of internal oxidation (g/m$^2$) | Presence or absence | |
| 1 | A | 0.03 | 4.5 | 50 | −35 | 590 | 1.5 | 500 | 0.008 | x | x |
| 2 | A | 0.03 | 4.5 | 50 | −12 | 650 | 1.5 | 500 | 0.036 | ○ | ○ |
| 3 | A | 0.03 | 4.5 | 50 | −10 | 650 | 1.5 | 500 | 0.037 | ○ | ○ |
| 4 | A | 0.03 | 4.5 | 50 | −5 | 650 | 1.5 | 500 | 0.041 | ○ | ○ |
| 5 | A | 0.03 | 4.5 | 50 | 20 | 650 | 1.5 | 500 | 0.082 | ○ | ○ |
| 6 | A | 0.03 | 4.5 | 50 | −5 | 650 | 0.2 | 500 | 0.019 | ○ | ○ |
| 7 | A | 0.03 | 4.5 | 50 | −5 | 650 | 0.4 | 500 | 0.026 | ○ | ○ |
| 8 | A | 0.03 | 4.5 | 50 | −5 | 650 | 0.5 | 500 | 0.035 | ○ | ○ |
| 9 | A | 0.03 | 4.5 | 50 | −5 | 650 | 1.0 | 500 | 0.042 | ○ | ○ |
| 10 | A | 0.03 | 4.5 | 50 | −5 | 650 | 10.0 | 500 | 0.049 | ○ | ○ |
| 11 | A | 0.03 | 4.5 | 50 | −5 | 590 | 1.5 | 500 | 0.028 | ○ | x |
| 12 | A | 0.03 | 4.5 | 50 | −5 | 600 | 1.5 | 500 | 0.030 | ○ | ○ |
| 13 | A | 0.03 | 4.5 | 50 | −5 | 700 | 1.5 | 500 | 0.045 | ○ | ○ |
| 14 | A | 0.03 | 4.5 | 50 | −5 | 750 | 1.5 | 500 | 0.056 | ○ | ○ |
| 15 | A | 0.03 | 4.5 | 50 | −5 | 770 | 1.5 | 500 | 0.074 | ○ | ○ |
| 16 | A | 0.03 | 4.5 | 50 | −5 | 650 | 1.5 | no alloying | 0.039 | ○ | ○ |
| 17 | A | 0.03 | 4.5 | 50 | −15 | 650 | 1.5 | no alloying | 0.021 | ○ | x |
| 18 | A | 0.03 | 4.5 | 50 | −5 | 650 | 1.5 | no alloying | 0.036 | ○ | ○ |
| 19 | A | 0.03 | 4.5 | 50 | 0 | 650 | 1.5 | no alloying | 0.053 | ○ | ○ |
| 20 | A | 0.03 | 4.5 | 50 | −5 | 650 | 1.5 | 460 | 0.035 | ○ | ○ |
| 21 | A | 0.03 | 4.5 | 50 | −5 | 650 | 1.5 | 550 | 0.034 | ○ | ○ |
| 22 | A | 0.03 | 4.5 | 50 | −5 | 650 | 1.5 | 500 | 0.039 | ○ | ○ |
| 23 | A | 0.03 | 4.5 | 50 | −5 | 650 | 1.5 | 500 | 0.038 | ○ | ○ |
| 24 | A | 0.03 | 4.5 | 50 | −5 | 650 | 1.5 | 500 | 0.037 | ○ | ○ |
| 25 | A | 0.03 | 4.5 | 50 | −5 | 650 | 1.5 | 500 | 0.040 | ○ | ○ |
| 26 | A | 0.03 | 4.5 | 50 | −5 | 650 | 1.5 | 500 | 0.039 | ○ | ○ |
| 27 | B | 0.03 | 4.6 | 50 | −5 | 650 | 1.5 | 500 | 0.041 | ○ | ○ |
| 28 | C | 0.03 | 4.7 | 50 | −5 | 650 | 1.5 | 500 | 0.039 | ○ | ○ |
| 29 | D | 0.1 | 4.5 | 50 | −5 | 650 | 1.5 | 500 | 0.037 | ○ | ○ |
| 30 | E | 0.3 | 4.7 | 50 | −5 | 650 | 1.5 | 500 | 0.035 | ○ | ○ |
| 31 | F | 0.5 | 4.6 | 50 | −5 | 650 | 1.5 | 500 | 0.036 | ○ | ○ |
| 32 | G | 0.03 | 3.6 | 50 | −5 | 650 | 1.5 | 500 | 0.037 | ○ | ○ |
| 33 | H | 0.03 | 6.3 | 50 | −5 | 650 | 1.5 | 500 | 0.038 | ○ | ○ |
| 34 | I | 0.03 | 8.0 | 50 | −5 | 650 | 1.5 | 500 | 0.039 | ○ | ○ |
| 35 | J | 0.03 | 4.5 | 50 | −5 | 650 | 1.5 | 500 | 0.041 | ○ | ○ |
| 36 | K | 0.03 | 4.6 | 50 | −5 | 650 | 1.5 | 500 | 0.040 | ○ | ○ |
| 37 | L | 0.03 | 4.7 | 50 | −5 | 650 | 1.5 | 500 | 0.041 | ○ | ○ |
| 38 | M | 0.03 | 4.5 | 50 | −5 | 650 | 1.5 | 500 | 0.039 | ○ | ○ |
| 39 | N | 0.02 | 4.7 | 50 | −5 | 650 | 1.5 | 500 | 0.037 | ○ | ○ |
| 40 | O | 0.03 | 4.6 | 50 | −5 | 650 | 1.5 | 500 | 0.038 | ○ | ○ |

TABLE 2-continued

| 41 | P | 0.03 | 4.5 | 50 | −5 | 650 | 1.5 | 500 | 0.039 | ○ | ○ |
| 42 | Q | 0.02 | 4.7 | 50 | −5 | 650 | 1.5 | 500 | 0.041 | ○ | ○ |
| 43 | R | 0.03 | 4.5 | 50 | −5 | 650 | 1.5 | 500 | 0.042 | ○ | ○ |
| 44 | S | 0.03 | 4.5 | 50 | −5 | 650 | 1.5 | 500 | 0.040 | ○ | ○ |
| 45 | T | 0.02 | 4.7 | 50 | −5 | 650 | 1.5 | 500 | 0.039 | ○ | ○ |
| 46 | U | 0.03 | 4.6 | 50 | −5 | 650 | 1.5 | 500 | 0.038 | ○ | ○ |
| 47 | XA | 0.02 | 4.6 | 50 | −5 | 650 | 1.5 | 500 | 0.038 | ○ | ○ |
| 48 | XB | 0.03 | 4.7 | 50 | −5 | 650 | 1.5 | 500 | 0.039 | ○ | ○ |
| 49 | XC | 0.6  | 4.5 | 50 | −5 | 650 | 1.5 | 500 | 0.041 | ○ | ○ |
| 50 | XD | 0.03 | 3.5 | 50 | −5 | 650 | 1.5 | 500 | 0.032 | ○ | ○ |
| 51 | XE | 0.03 | 4.6 | 50 | −5 | 650 | 1.5 | 500 | 0.038 | ○ | ○ |
| 52 | XF | 0.02 | 4.5 | 50 | −5 | 650 | 1.5 | 500 | 0.041 | ○ | ○ |
| 53 | XG | 0.02 | 4.7 | 50 | −5 | 650 | 1.5 | 500 | 0.038 | ○ | ○ |

| No. | Amount of deposition (g/m$^2$) | Coating species | Fe content in coating layer (percent by mass) | Coating appearance | Coating peel resistance | Corrosion resistance | TS (MPa) | El (%) | TS × EL | Formabilty | Remarks |
| --- | --- | --- | --- | --- | --- | --- | --- | --- | --- | --- | --- |
| 1  | 50  | GA | 10 | x | x | ○ | 1011 | 24.6 | 24871 | good | Comparative example |
| 2  | 50  | GA | 10 | ○ | x | ○ | 1019 | 25.0 | 25475 | good | Comparative example |
| 3  | 50  | GA | 10 | ○ | ○ | ○ | 1032 | 24.2 | 24974 | good | Invention example |
| 4  | 50  | GA | 10 | ○ | ○ | ○ | 1039 | 25.3 | 26287 | good | Invention example |
| 5  | 50  | GA | 10 | ○ | ○ | ○ | 1010 | 24.0 | 24240 | good | Invention example |
| 6  | 50  | GA | 10 | ○ | ○ | ○ | 1012 | 22.3 | 22568 | poor | Comparative example |
| 7  | 50  | GA | 10 | ○ | ○ | ○ | 1022 | 23.1 | 23608 | poor | Comparative example |
| 8  | 50  | GA | 10 | ○ | ○ | ○ | 1035 | 24.6 | 25358 | good | Invention example |
| 9  | 50  | GA | 10 | ○ | ○ | ○ | 1038 | 25.2 | 27196 | good | Invention example |
| 10 | 50  | GA | 10 | ○ | ○ | ○ | 1044 | 26.3 | 27457 | good | Invention example |
| 11 | 50  | GA | 10 | ○ | ○ | ○ | 992  | 23.6 | 23411 | poor | Comparative example |
| 12 | 50  | GA | 10 | ○ | ○ | ○ | 1007 | 24.8 | 24974 | good | Invention example |
| 13 | 50  | GA | 10 | ○ | ○ | ○ | 1031 | 25.9 | 26703 | good | Invention example |
| 14 | 50  | GA | 10 | ○ | ○ | ○ | 1048 | 24.9 | 26095 | good | Invention example |
| 15 | 50  | GA | 10 | x | x | ○ | 1054 | 26.8 | 27193 | good | Comparative example |
| 16 | 50  | GI | 1  | ○ | ○ | ○ | 1058 | 24.6 | 26027 | good | Invention example |
| 17 | 50  | GI | 1  | x | ○ | ○ | 1017 | 23.8 | 24205 | good | Comparative example |
| 18 | 50  | GI | 1  | ○ | ○ | ○ | 1024 | 23.6 | 24166 | good | Invention example |
| 19 | 50  | GI | 1  | ○ | ○ | ○ | 1010 | 23.9 | 24139 | good | Invention example |
| 20 | 50  | GA | 8  | ○ | ○ | x | 1054 | 24.4 | 25718 | good | Invention example |
| 21 | 50  | GA | 13 | ○ | ○ | ○ | 1055 | 24.5 | 25848 | good | Invention example |
| 22 | 18  | GA | 10 | ○ | ○ | ○ | 1059 | 24.1 | 25522 | good | Comparative example |
| 23 | 20  | GA | 10 | ○ | ○ | ○ | 1049 | 23.9 | 25071 | good | Invention example |
| 24 | 90  | GA | 10 | ○ | x | ○ | 1060 | 23.8 | 25228 | good | Invention example |
| 25 | 120 | GA | 10 | ○ | ○ | ○ | 1051 | 23.9 | 25119 | good | Invention example |
| 26 | 130 | GA | 10 | ○ | ○ | ○ | 1052 | 23.7 | 24932 | good | Comparative example |
| 27 | 50  | GA | 10 | ○ | ○ | ○ | 652  | 38.9 | 25363 | good | Invention example |
| 28 | 50  | GA | 10 | ○ | ○ | ○ | 1302 | 18.6 | 24217 | good | Invention example |
| 29 | 50  | GA | 10 | ○ | ○ | ○ | 1048 | 23.5 | 24628 | good | Invention example |
| 30 | 50  | GA | 10 | ○ | ○ | ○ | 761  | 36.0 | 27396 | good | Invention |

TABLE 2-continued

| | | | | | | | | | | | |
|---|---|---|---|---|---|---|---|---|---|---|---|
| 31 | 50 | GA | 10 | ○ | ○ | ○ | 1048 | 25.4 | 26619 | good | Invention example |
| 32 | 50 | GA | 10 | ○ | ○ | ○ | 1047 | 23.8 | 24919 | good | Invention example |
| 33 | 50 | GA | 10 | ○ | ○ | ○ | 1052 | 24.6 | 25879 | good | Invention example |
| 34 | 50 | GA | 10 | ○ | ○ | ○ | 1060 | 24.0 | 25440 | good | Invention example |
| 35 | 50 | GA | 10 | ○ | ○ | ○ | 1054 | 24.6 | 25928 | good | Invention example |
| 36 | 50 | GA | 10 | ○ | ○ | ○ | 1041 | 24.1 | 25088 | good | Invention example |
| 37 | 50 | GA | 10 | ○ | ○ | ○ | 1040 | 23.8 | 24752 | good | Invention example |
| 38 | 50 | GA | 10 | ○ | ○ | ○ | 1048 | 23.8 | 24942 | good | Invention example |
| 39 | 50 | GA | 10 | ○ | ○ | ○ | 1049 | 23.4 | 24547 | good | Invention example |
| 40 | 50 | GA | 10 | ○ | ○ | ○ | 1052 | 23.6 | 24827 | good | Invention example |
| 41 | 50 | GA | 10 | ○ | ○ | ○ | 1044 | 24.6 | 25682 | good | Invention example |
| 42 | 50 | GA | 10 | ○ | ○ | ○ | 1047 | 23.6 | 24709 | good | Invention example |
| 43 | 50 | GA | 10 | ○ | ○ | ○ | 1033 | 23.4 | 24172 | good | Invention example |
| 44 | 50 | GA | 10 | ○ | ○ | ○ | 1031 | 25.1 | 25878 | good | Invention example |
| 45 | 50 | GA | 10 | ○ | ○ | ○ | 1044 | 24.1 | 26160 | good | Invention example |
| 46 | 50 | GA | 10 | ○ | ○ | ○ | 1048 | 25.6 | 26829 | good | Invention example |
| 47 | 50 | GA | 10 | x | x | ○ | 568 | 37.1 | 21073 | poor | Comparative example |
| 48 | 50 | GA | 10 | ○ | ○ | ○ | 1399 | 16.3 | 22804 | poor | Comparative example |
| 49 | 50 | GA | 10 | x | x | ○ | 1066 | 24.8 | 26437 | good | Comparative example |
| 50 | 50 | GA | 10 | ○ | x | ○ | 1068 | 21.8 | 23282 | poor | Comparative example |
| 51 | 50 | GA | 10 | x | ○ | ○ | 1070 | 23.9 | 25573 | good | Comparative example |
| 52 | 50 | GA | 10 | x | x | ○ | 1038 | 22.3 | 23147 | poor | Comparative example |
| 53 | 50 | GA | 10 | ○ | ○ | ○ | 1034 | 18.8 | 19439 | poor | Comparative example |

As is clear from Table 2, GI and GA (Invention examples) produced by the method according to the present invention have excellent formability and coating peel resistance at severe forming and have good coating appearance in spite of being high strength steel sheets containing large amounts of easy-to-oxidize elements, e.g., Si and Mn On the other hand, in Comparative examples, at least one of coating appearance, formability, and coating peel resistance at severe forming is poor.

The high strength galvanized steel sheet according to the present invention has excellent coating appearance, formability, and coating peel resistance at severe forming and can be utilized as a coated steel sheet to reduce the weight and enhance the strength of car body in itself of automobiles. Also, the high strength galvanized steel sheet according to the present invention to which rust preventive properties are given can be applied as a coated steel sheet to wide fields, e.g., the fields of home appliances and constructions, other than automobiles.

The invention claimed is:

1. A method for manufacturing a high strength galvanized steel sheet having a zinc coating layer with an amount of deposition of coating of 20 to 120 g/m² per one surface on the surface of a base steel sheet having a chemical composition comprising C: 0.03% to 0.35%, Si: 0.01% to 0.50%, Mn: 3.6% to 8.0%, Al: 0.001% to 1.000%, P≤0.10%, S≤0.010%, and the balance comprising Fe and incidental impurities, on a percent by mass basis, the method comprising the step of subjecting the base steel sheet to annealing and galvanization treatment in a continuous galvanizing line, wherein the maximum steel sheet temperature in an annealing furnace is 600° C. or higher and 750° C. or lower,
the steel sheet transit time in a temperature region of the steel sheet temperature of 600° C. or higher and 750° C. or lower is specified to be 30 seconds or more and 10 minutes or less, and the dew point in an atmosphere is specified to be −10° C. or higher, and
0.010 to 0.100 g/m² per one surface of oxides of at least one selected from Fe, Si, Mn, Al, P, B, Nb, Ti, Cr, Mo, Cu, and Ni are formed the surface layer within 100 μm from the base steel sheet surface just below the zinc coating and, in addition oxides containing Mn are present in the grains of the base steel sheet within 1 μm from the grain boundaries of the base steel sheet in the surface layer within 10 μm from the base steel sheet surface just below the zinc coating layer.

2. The method for manufacturing a high strength galvanized steel sheet, according to claim 1, wherein after the galvanization treatment is applied, an alloying treatment is further applied by heating the steel sheet to a temperature of 450° C. or higher and 600° C. or lower to specify the Fe content in the zinc coating layer to be within the range of 8 to 14 percent by mass.

3. The method for manufacturing a high strength galvanized steel sheet, according to claim 1, wherein the chemical composition further contains at least one selected from B: 0.001% to 0.005%, Nb: 0.005% to 0.050%, Ti: 0.005% to 0.050%, Cr: 0.001% to 1.000%, Mo: 0.05% to 1.00%, Cu: 0.05% to 1.00%, and Ni: 0.05% to 1.00%, on a percent by mass basis.

4. The method for manufacturing a high strength galvanized steel sheet, according to claim 3 wherein after the galvanization treatment is applied, an alloying treatment is further applied by heating the steel sheet to a temperature of 450° C. or higher and 600° C. or lower to specify the Fe content in the zinc coating layer to be within the range of 8 to 14 percent by mass.

5. The method for manufacturing a high strength galvanized steel sheet according to claim 1, wherein the atmosphere of the annealing furnace is composed of nitrogen, hydrogen, and incidental impurities, and wherein the dew point is controlled by introducing humidified nitrogen.

\* \* \* \* \*

UNITED STATES PATENT AND TRADEMARK OFFICE
CERTIFICATE OF CORRECTION

PATENT NO. : 10,449,751 B2
APPLICATION NO. : 14/386234
DATED : October 22, 2019
INVENTOR(S) : Yusuke Fushiwaki et al.

It is certified that error appears in the above-identified patent and that said Letters Patent is hereby corrected as shown below:

On the Title Page

Item [73], Assignee:
"JFE STEEL CORPORATION, Tokyo, (JP)" should read --JFE STEEL CORPORATION, Chiyoda-ku, Tokyo, (JP)--.

In the Claims

In Column 18, Line 58, in Claim 1:
"formed the surface" should read --formed in the surface--.

Signed and Sealed this
Seventh Day of January, 2020

Andrei Iancu
*Director of the United States Patent and Trademark Office*